US012003050B2

(12) United States Patent
Cayzac

(10) Patent No.: US 12,003,050 B2
(45) Date of Patent: *Jun. 4, 2024

(54) ELECTRICAL CONNECTOR AND ELECTRICAL CONNECTING DEVICE

(71) Applicant: AMPHENOL-AIR LB, Carignan (FR)

(72) Inventor: Gaspard Cayzac, Margut (FR)

(73) Assignee: AMPHENOL-AIR LB, Carignan (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,076

(22) Filed: Apr. 20, 2023

(65) Prior Publication Data

US 2023/0261406 A1 Aug. 17, 2023

Related U.S. Application Data

(63) Continuation of application No. 16/934,339, filed on Jul. 21, 2020, now Pat. No. 11,664,616.

(30) Foreign Application Priority Data

Jul. 30, 2019 (FR) ....................................... 1908642

(51) Int. Cl.
*H01R 13/05* (2006.01)
*H01R 13/405* (2006.01)
(Continued)

(52) U.S. Cl.
CPC ......... *H01R 13/052* (2013.01); *H01R 13/405* (2013.01); *H01R 13/50* (2013.01);
(Continued)

(58) Field of Classification Search
CPC ............ H01R 2201/26; H01R 2107/00; H01R 13/521; H01R 13/50; H01R 13/405; H01R 13/052
See application file for complete search history.

(56) References Cited

U.S. PATENT DOCUMENTS 3,850,495 A 11/1974 Glover
7,618,287 B2 11/2009 Haas
(Continued)

FOREIGN PATENT DOCUMENTS

DE 102011006928 A1 10/2012
EP 2161795 A2 3/2010
(Continued)

OTHER PUBLICATIONS

French Search Report and Written Opinion dated Mar. 25, 2020 in priority application No. FR1908642; w/English machine translation (total 17 pages).

(Continued)

*Primary Examiner* — Briggitte R. Hammond
(74) *Attorney, Agent, or Firm* — Seckel IP, PLLC

(57) ABSTRACT

The electrical connector (2) includes a connector body (20), which includes at least one accommodation (21), at least two electrical connecting organs (22, 22'), which each include at least one internal section (220, 220') extending inside the at least one accommodation (21), and electrical insulating means (23), which have a tracking resistance index, CTI, higher than 600, which are located at least inside the at least one accommodation (21), which surround at least the internal section (220, 220') of the at least two electrical connecting organs (22, 22'), and which extend in the internal section (220, 220') of the at least two electrical connecting organs (22, 22').

20 Claims, 4 Drawing Sheets

(51) Int. Cl.
*H01R 13/50* (2006.01)
*H01R 13/52* (2006.01)
*H01R 107/00* (2006.01)

(52) U.S. Cl.
CPC ........ *H01R 13/521* (2013.01); *H01R 2107/00* (2013.01); *H01R 2201/26* (2013.01)

(56) References Cited

U.S. PATENT DOCUMENTS

| | | | | |
|---|---|---|---|---|
| 9,923,299 | B2 | 3/2018 | Cayzac | |
| 10,720,728 | B2 | 7/2020 | Mears | |
| 11,664,616 | B2 * | 5/2023 | Cayzac | H01R 13/50 439/825 |
| 2008/0096421 | A1 | 4/2008 | Hass | |
| 2011/0021049 | A1 | 1/2011 | Ramasubramanian et al. | |
| 2017/0194737 | A1 | 7/2017 | Cayzac | |
| 2020/0153155 | A1 | 5/2020 | Mears et al. | |

FOREIGN PATENT DOCUMENTS

| | | | |
|---|---|---|---|
| EP | 3190668 | A1 | 7/2017 |
| FR | 2732165 | A1 | 9/1996 |
| FR | 2742264 | A1 | 6/1997 |
| FR | 2965114 | A1 | 3/2012 |
| GB | 2208191 | A1 | 3/1989 |

OTHER PUBLICATIONS

European Search Report and Written Opinion dated Oct. 21, 2020 in application No. EP20188579.5, counterpart of parent U.S. Appl. No. 16/934,339; w/English machine translation (total 17 pages).

* cited by examiner

ELECTRICAL CONNECTOR AND ELECTRICAL CONNECTING DEVICE

BACKGROUND OF THE INVENTION (1) Cross-Reference to Related Applications

This application is a continuation of U.S. patent application Ser. No. 16/934,339 filed Jul. 21, 2020, which claims priority of French application No. 1908642 filed Jul. 30, 2019, each of which is hereby incorporated by reference herein in its entirety.

(2) Field of the Invention

The present invention relates to an electrical connector, more particularly to a male electrical connector and a female electrical connector. This invention also relates to an electrical connecting device including such a male connector and such a female connector.

The invention is related to the field of manufacturing of the electrical connecting devices. This invention will find a particularly suitable, but in no way restrictive, application when causing high-power current to pass through a reduced-size connecting device, without adding weight to such a connecting device and without increasing the size of the contacts. In fact, this invention will find a particularly suitable use when vehicles (namely motor vehicles or aircrafts) must be equipped with such an electrical connecting device.

(3) Description of the Prior Art

Already known are electrical connecting devices, which comprise, on the one hand, a male electrical connector, which includes at least one male electrical connecting organ each consisting of an electrical connecting pin and, on the other hand, a female electrical connector, which includes at least one female electrical connecting organ, each consisting of an electrical connecting socket and which is each configured to cooperate with the male electrical connecting organ or with one of the male electrical connecting organs.

Between, on the one hand, such an electrical connecting organ (male, respectively female organ of a male, respectively female electrical connector) and, on the other hand, another electrical connecting organ (male, respectively female organ of the same male, respectively female electrical connector) or an electrical conductor (namely external to the connecting device), a layer of air is usually observed. In the event a potential difference occurs between, on the one hand, said electrical connecting organ and, on the other hand, said other electrical connecting organ or said electrical conductor, an ionization of the air of the layer of air occurs. This ionization generates partial discharges, which cause a degradation of said (male or female) electrical connecting organ and/or of the insulating material, which partly forms said (male or female) electrical connector. Such degradation leads to an alteration of the electrical conduction properties of such an electrical connecting organ and/or of the insulation properties of such an electrical connector. When a vehicle is fitted with such an electrical connector, such alteration results into endangering the persons on board such a vehicle, which is not admissible.

It should be observed that the phenomenon of ionization and, hence, the occurrence of partial discharges are amplified by the altitude and can become particularly catastrophic for electrical connectors (and electrical connecting devices including such electrical connectors), which an aircraft is equipped with.

In order to cope with the phenomenon of ionization and/or the occurrence of such partial discharges, it is known to space the electrical connecting organs or to separate these electrical connecting organs by means of an insulating partition.

However, the development of electric vehicles (namely motor vehicles or aircrafts) requires the use of electrical connecting devices, which must permit an electric current, the electrical power of which can be significant, to pass through them, while having a reduced size. Such a reduction in overall dimensions has led to miniaturize these electrical connecting devices, which can then include at least 30 electrical connecting organs in a space of less than 150 $mm^2$. This miniaturization then resulted into a reduction in spacing between two electrical connecting organs and/or a reduction in thickness of the insulating partition between two electrical connecting organs.

This reduction in spacing and this reduction in thickness then lead to an increase in the phenomenon of ionization and of the partial discharges, which have been mentioned above, and which cause the undesirable effects mentioned above.

SUMMARY OF THE INVENTION

The present invention pretends to cope with the drawbacks of the prior-art connecting devices.

To this end, the invention relates to an electrical connector including, on the one hand, a connector body, which includes at least one accommodation, on the other hand, at least two electrical connecting organs, which each include at least one internal section extending inside said at least one accommodation of the connector body. This electrical connector is characterized in that it includes electrical insulating means, which have an tracking resistance index, CTI, higher than 600, which are located at least inside said at least one accommodation, which surround at least the internal section of said at least two electrical connecting organs, and which extend at least over the internal section of said at least two electrical connecting organs.

According to another feature, the electrical insulating means are into contact at least with the internal section of said at least two electrical connecting organs and/or with the inner surface of said at least one accommodation.

Another feature of such an electrical connector relates to the fact that the electrical insulating means include either at least one coating applied onto the inner surface of at least a portion of said at least one accommodation and/or onto at least a portion of the internal section of said at least two electrical connecting organs, or at least one lining of the inner surface of at least a portion of said at least one accommodation and/or at least a portion of the internal section of said at least two electrical connecting organs.

Alternatively or additionally, the electrical insulating means include at least one flexible sleeve positioned inside at least a portion of said at least one accommodation and/or inside which is positioned at least a portion of the internal section of said at least two electrical connecting organs.

Alternatively or additionally, the electrical insulating means may include a layer of electrical insulating material interposed between, on the one hand, the inner surface of at least a portion of said at least one accommodation and, on the other hand, the outer surface of at least a portion of the internal section of said at least two electrical connecting organs.

Also alternatively or additionally, the electrical insulating means may include an electrical insulating block, which is located at least inside at least a portion of said at least one accommodation, and which receives inside at least a portion of the internal section of said at least two electrical connecting organs.

According to another feature, the connector body has a front end and a rear end, while the electrical insulating means extend at least from the front end and to the rear end of the connector body, in a continuous way.

Another feature consists in that the electrical insulating means are formed of an overmolding of a material having a tracking resistance index, CTI, higher than 600, on the inner surface of at least a portion of said at least one accommodation and/or on the outer surface of at least a portion of the internal section of said at least two electrical connecting organs.

Yet another feature relates to the fact that, on the one hand, said at least one accommodation includes at least two front portions and a rear portion and, on the other hand, the internal section of said at least two electrical connecting organs includes a front portion, at least a portion of which extends inside the front portions of said at least one accommodation, as well as a rear portion, at least a portion of which extends within the rear portion of said at least one accommodation.

The electrical insulating means then include at least two front electrical insulating elements, which are located in the front portions of said at least one accommodation, which surround at least the front portion of the internal section of said at least two electrical connecting organs, and which extend over the front portion of the internal section of said at least two electrical connecting organs and which each include either said at least one coating or said at least one lining, or said layer of electrical insulating material.

The electrical insulating means also include at least one rear electrical insulating element, which is located in the rear portion of said at least one accommodation, which surrounds at least the rear portion of the internal section of said at least two electrical connecting organs, which extends over the rear portion of the internal section of said at least two electrical connecting organs and which includes at least said electrical insulating block.

The invention also relates to a male electrical connector including, on the one hand, a male connector body, which includes at least one accommodation, on the other hand, at least two male electrical connecting organs, which each include, an internal section extending inside said at least one accommodation as well as an external section extending outside the male connector body. This male electrical connector has the features of the electrical connector described above, while the electrical insulating means surround at least a portion of the external section of said at least two male electrical connecting organs and extend over a portion of the external section of said at least two male electrical connecting organs.

The invention also relates to a female electrical connector including, on the one hand, a female connector body, which includes at least one accommodation, on the other hand, at least two female electrical connecting organs, which each include an internal section extending inside said at least one accommodation. This female electrical connector has the features of the electrical connector described above, while the electrical insulating means surround the internal section of said at least two female electrical connecting organs and extend over the internal section of said at least two female electrical connecting organs.

Finally, the invention relates to an electrical connecting device including, on the one hand, a male electrical connector, which has the features described above and, on the other hand, a female electrical connector, which has the features described above.

In this electrical connecting device, the electrical insulating means of the male electrical connector are located in the extension of the electrical insulating means of the female electrical connector and cooperate with these electrical insulating means of the female electrical connector.

Thus, the invention relates to an electrical connector including electrical insulating means, which have a tracking resistance index, CTI, higher than 600, which are located at least inside said at least one accommodation, which surround at least the internal section of said at least two electrical connecting organs, and which extend at least over the internal section of said at least two electrical connecting organs.

The presence of these electrical insulating means advantageously permits to electrically insulate said at least one electrical connecting organ, which an electrical connector includes, with respect to at least another electrical connecting organ of this electrical connector and/or with respect to an electrical conductor (namely external to the electrical connector). This then advantageously permits to limit, even prevent, the occurrence of partial discharges. This results into a reduction in degradation of such an electrical connecting organ and/or of the insulating material, which partly forms said electrical connector. This permits to preserve the electrical conductivity properties of such an electrical connecting organ and/or the insulating properties of such an electrical connector.

Another feature relates to the fact that the electrical insulating means are into contact at least with the internal section of said at least two electrical connecting organs. This feature advantageously permits to reduce, even avoid, a layer of air on the surface of such an electrical connecting organ. This results into a reduction, even an elimination, of the phenomenon of air ionization and, thus, of partial discharges.

Yet another feature relates to the fact that the electrical insulating means extend at least from the front end and to the rear end of the connector body, in a continuous way. This feature advantageously permits a continuous electrical insulation throughout the electrical connector.

Another feature relates to the fact that the electrical insulating means of the male electrical connector are located in the extension of the electrical insulating means of the female electrical connector. This feature advantageously permits a continuous electrical insulation throughout the electrical connecting device.

Further aims and advantages of the present invention will become clear during the following description relating to embodiments, which are given only by way of indicative and non-restrictive examples.

The understanding of this description will be facilitated when referring to the attached drawings.

DETAILED DESCRIPTION OF THE PREFERRED EMBODIMENT

The present invention is related to the field of the manufacturing of the electrical connecting devices. This invention will find a particularly suitable application when causing high-power current to pass through a reduced-size electrical connecting device, namely a miniaturized device. This invention will find a particularly suitable use when vehicles (namely motor vehicles or aircrafts) must be equipped with such an electrical connecting device.

Figure 1:
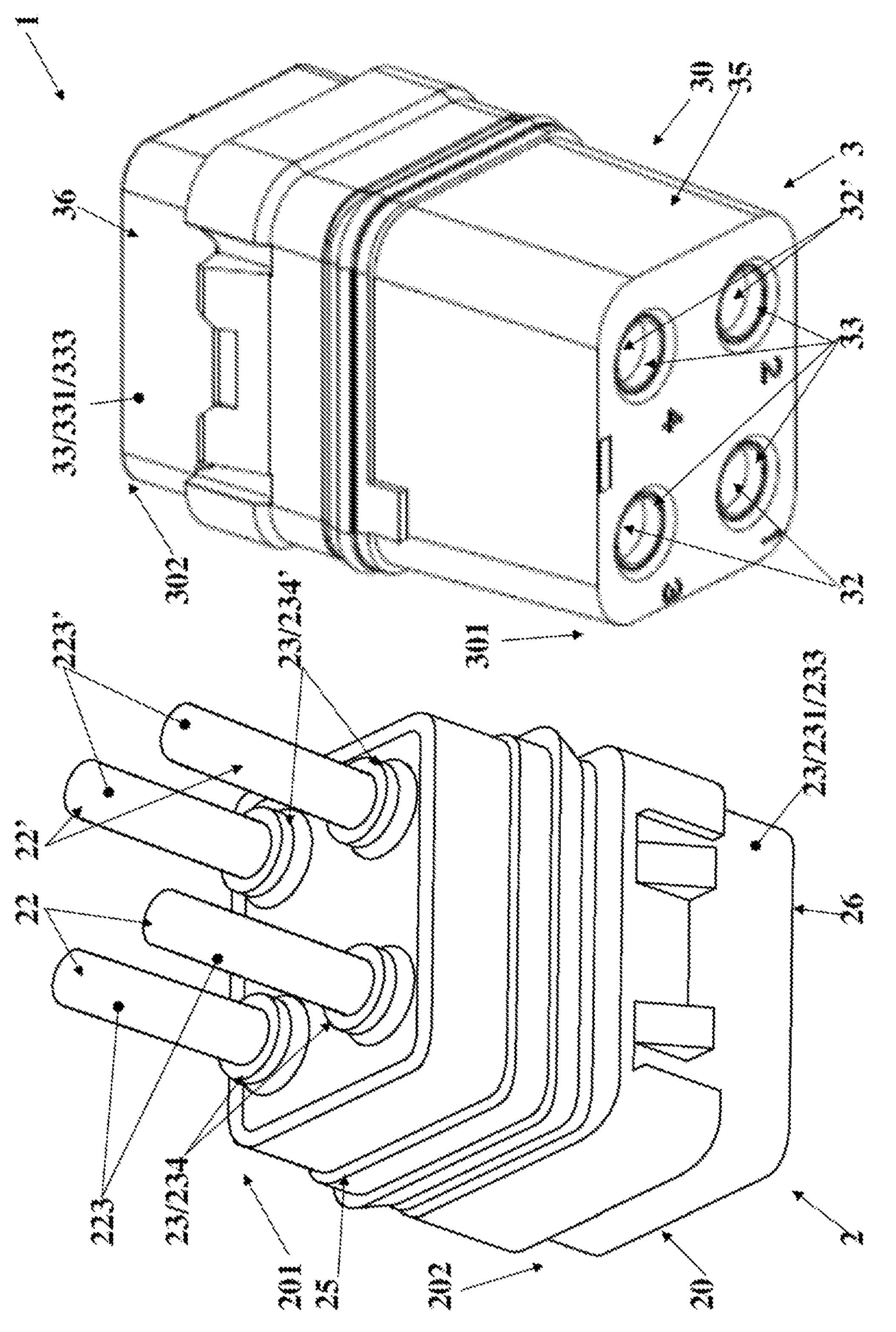
FIG. 1 represents a schematic and perspective view of an electrical connecting device, which includes a male electrical connector and a female electrical connector, in the disconnected position.
Figure 2:
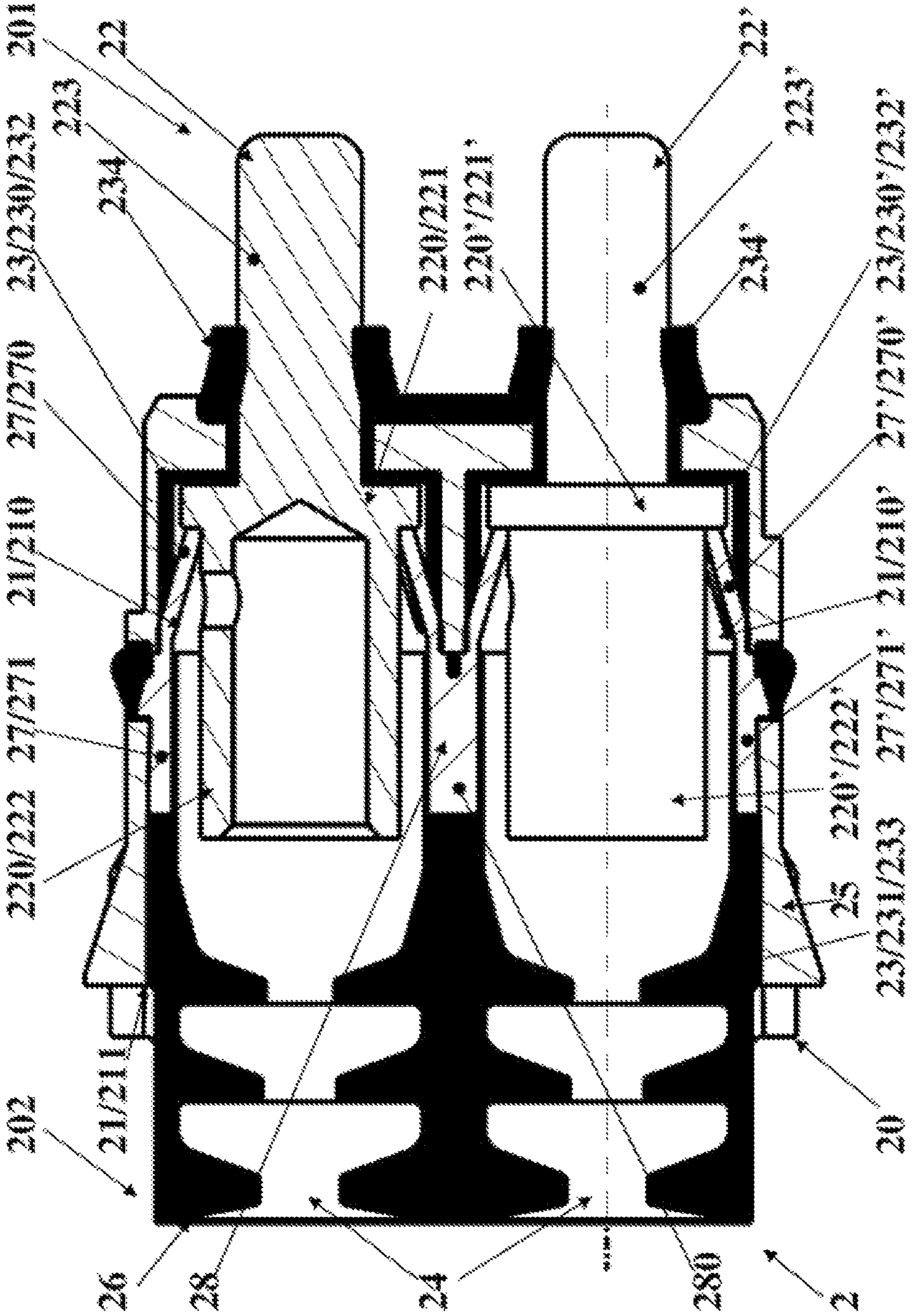
FIG. 2 represents a schematic and longitudinal cross-sectional view of the male electrical connector shown in FIG. 1 and in which one of the electrical connecting organs is located in the cross-sectional plane, while another of these electrical connecting organs is located outside the cross-sectional plane.
Figure 3:
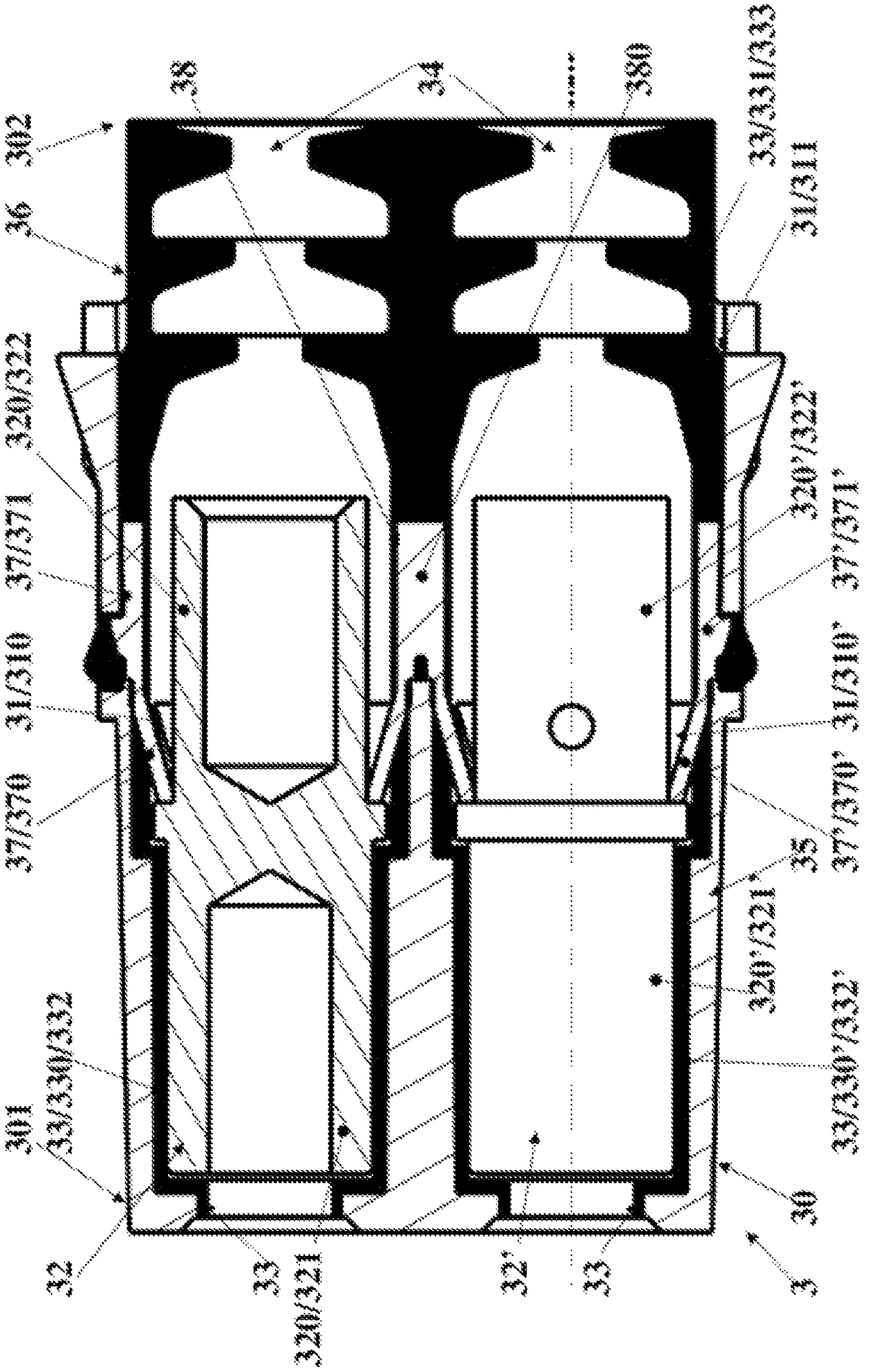
FIG. 3 represents a schematic and longitudinal cross-sectional view of the female electrical connector shown in FIG. 1 and in which one of the electrical connecting organs is located in the cross-sectional plane, while another of these electrical connecting organs is located outside the cross-sectional plane.
Figure 4:
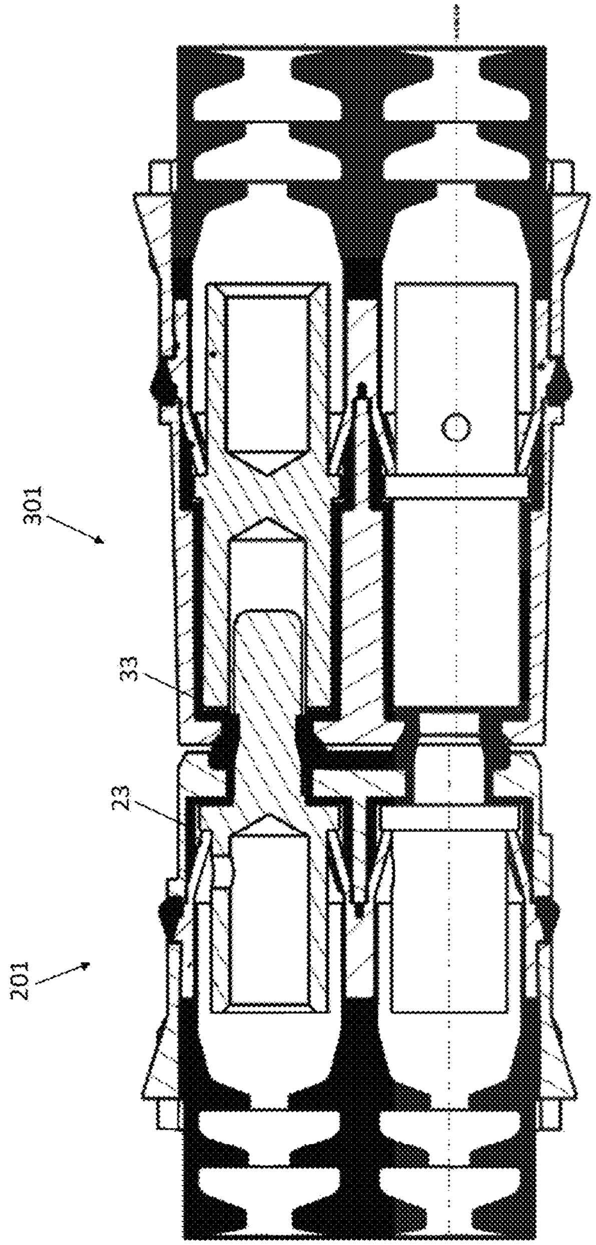
FIG. 4 represents a schematic and longitudinal cross-sectional view of the male and female electrical connectors of FIGS. 2 and 3, connected with each other.

Such an electrical connecting device 1 has been shown in FIG. 1 and includes, on the one hand, a male electrical connector 2, which is shown in FIGS. 1 and 2, and which is intended to be connected to a first bundle of electrical wires (not shown) and, on the other hand, a female electrical connector 3, which is shown in FIGS. 1 and 3, and which is intended to be connected to a second bundle of electrical wires (not shown).

This male electrical connector 2 and this female electrical connector 3 are configured to be connected (in order to ensure an electrical connection between the electrical wires of the first bundle of electrical wires and the electrical wires of the second bundle of electrical wires) and disconnected (in order to interrupt the electrical connection between the electrical wires of the first bundle of electrical wires and the electrical wires of the second bundle of electrical wires), namely manually and by an operator.

The invention therefore relates to an electrical connector, which, as the case may be, may be a male electrical connector 2 or a female electrical connector 3.

Such a (male 2; female 3) electrical connector includes a connector body (20; 30), which has a front end (201; 301), which is intended to be oriented towards the other (female 3; male 2) electrical connector of the electrical connecting device 1, which this (male 2; female 3) electrical connector is intended to cooperate with. This connector body (20; 30) also has a rear end (202; 302), which is intended to be oriented in a direction opposite to the other (female 3; male 2) electrical connector of the electrical connecting device 1, which this (male 2; female 3) electrical connector is intended to cooperate with.

Such a connector body (20; 30) includes at least one accommodation (21; 31).

Said at least one accommodation (21; 31) each includes, on the one hand, at least a front portion (210, 210'; 310; 310'), which is intended to be oriented towards the other (female 3; male 2) electrical connector of the electrical connecting device 1, which this (male 2; female 3) electrical connector is intended to cooperate with. As can be seen in the attached figures, said at least one accommodation (21; 31) preferably includes at least two front portions (210, 210'; 310; 310'), which are intended to be oriented towards the other (female 3; male 2) electrical connector of the electrical connecting device 1, which this (male 2; female 3) electrical connector is intended to cooperate with.

Said at least one accommodation (21; 31) also each includes a rear portion (211; 311), which is intended to be oriented in a direction opposite to the other (female 3; male 2) electrical connector of the electrical connecting device 1, which this (male 2; female 3) electrical connector is intended to cooperate with. This rear portion (211; 311) of said at least one accommodation (21; 31) communicates with said at least one front portion (210, 210'; 310; 310') of said at least one accommodation (21; 31).

Such a (male 2; female 3) electrical connector also includes at least one electrical connecting organ (22, 22; 32, 32), which each includes at least one internal section (220, 220'; 320, 320'), which extends inside said at least one accommodation (21; 31) of the connector body (20; 30) of this (male 2; female 3) electrical connector.

In fact and as can be seen in the attached figures, such a (male 2; female 3) electrical connector includes at least two electrical connecting organs (22, 22'; 32, 32'), which each include at least one internal section (220, 220'; 320, 320'), which extends inside said at least one accommodation (21; 31) of the connector body (20; 30) of this (male 2; female 3) electrical connector.

In this respect, it should be observed that the internal section (220, 220'; 320, 320') of said at least one electrical connecting organ (22, 22'; 32, 32') includes, on the one hand, a front portion (221, 221'; 321, 321'), at least part of which extends inside the front portion (210, 210'; 310, 310') of said at least one accommodation (21; 31) and, on the other hand, a rear portion (222, 222'; 322, 322'), at least part of which extends inside the rear portion (211; 311) of said at least one accommodation (21; 31).

As mentioned above, said at least one accommodation (21; 31) includes at least two front portions (210, 210'; 310, 310') and one rear portion (211; 311), while said connector electrical (2; 3) includes at least two electrical connecting organs (22, 22'; 32, 32'), which each include an internal section (220, 220'; 320, 320'), which includes a front portion (221, 221'; 321, 321') and a rear portion (222, 222'; 322, 322')The front portion (221, 221'; 321, 321) of the internal section (220, 220'; 320, 320') of said at least two electrical connecting organs (22, 22'; 32, 32') then includes at least a portion (even its entirety), which extends inside the front portions (210, 210'; 310, 310') of said at least one accommodation (21; 31).

More specifically, at least a portion (even the entirety) of the front portion (221; 321) of the internal section (220; 320) of one (22; 32) of said at least two electrical connecting organs (22, 22'; 32, 32') extends inside one (210; 310) of the front portions (210, 210'; 310, 310') of said at least one accommodation (21; 31) of the connector body (20; 30) of the (male 2; female 3) electrical connector, while at least a portion (even the entirety) of the front portion (221'; 321') of the internal section (220'; 320') of another (22'; 32') of said at least two electrical connecting organs (22, 22'; 32, 32') extends inside another one (210'; 310') of said front portions (210, 210'; 310, 310') of said at least one accommodation (21; 31) of the connector body (20; 30) of the (male 2; female 3) electrical connector.

At the same time, the rear portion (222, 222'; 322, 322') of the internal section (220, 220'; 320, 320') of said at least two electrical connecting organs (22, 22'; 32, 32') includes at least a portion, which extends inside the rear portion (211; 311) of said at least one accommodation (21; 31).

According to the invention, said (male 2; female 3) electrical connector includes electrical insulating means (23;

33), which have a tracking resistance index, CTI, higher than 600. This tracking resistance index, CTI, is also known by the Anglo-Saxon name of "comparative tracking index" (CTI).

The electrical insulating means (23; 33) are located at least inside said at least one accommodation (21; 31).

The electrical insulating means (23; 33) surround at least the internal section (220, 220'; 320, 320') of said at least one electrical connecting organ (22, 22'; 32, 32'), more particularly at least the internal section (220, 220'; 320, 320') of said at least two electrical connecting organs (22, 22'; 32, 32').

The electrical insulating means (23; 33) extend at least over the internal section (220, 220'; 320, 320') of said at least one electrical connecting organ (22, 22'; 32, 32'), more particularly at least over the internal section (220, 220'; 320, 320') of said at least two electrical connecting organs (22, 22'; 32, 32').

In fact, these electrical insulating means (23; 33) are into contact at least with the internal section (220, 220'; 320, 320') of said at least one electrical connecting organ (22, 22'; 32, 32'), more particularly at least with the internal section (220, 220'; 320, 320') of said at least two electrical connecting organs (22, 22'; 32, 32'), and/or with the inner surface of said at least one accommodation (21; 31).

According to a first embodiment, the electrical insulating means (23; 33) each include (even each consist of) at least one coating (namely consisting of an overmolding) applied onto the inner surface of at least a portion (210, 210', 211; 310, 310', 311) of said at least one accommodation (21; 31), more particularly onto the inner surface of the front portion (210, 210'; 310, 310') of said at least one accommodation (21; 31) and/or on the inner surface of the rear portion (211; 311) of said at least one accommodation (21; 31), in particular onto the entire inner surface of such a portion (210, 210', 211; 310, 310', 311) of said at least one accommodation (21; 31). Alternatively or additionally, said coating (namely consisting of an overmolding) can be applied onto at least a portion (221, 221', 222, 222'; 321, 321', 322, 322') of the internal section (220, 220'; 320, 320') of said at least one electrical connecting organ (22, 22'; 32, 32'), more particularly onto at least a portion (221, 221', 222, 222'; 321, 321', 322, 322') of the internal section (220, 220'; 320, 320') of said at least two electrical connecting organs (22, 22'; 32, 32'), namely onto the front portion (221, 221'; 321, 321') of said internal section (220, 220'; 320, 320') and/or onto the rear portion (222, 222'; 322, 322') of said internal section (220, 220'; 320, 320') of such an electrical connecting organ (22, 22'; 32, 32'). In fact, such a coating is namely applied onto the entirety of such a portion (221, 221', 222, 222'; 321, 321', 322, 322') of the internal section (220, 220'; 320, 320') of such an electrical connecting organ (22, 22'; 32, 32') and/or onto the outer surface of such a portion (221, 221', 222, 222'; 321, 321', 322, 322') of the internal section (220, 220'; 320, 320') of such an electrical connecting organ (22, 22'; 32, 32').

According to a second embodiment, the electrical insulating means (23; 33) each include (even each consist of) at least one lining (namely consisting of an overmolding) of the inner surface of at least a portion (210, 210', 211; 310, 310', 311) of said at least one accommodation (21; 31), more particularly of the inner surface of the front portion (210, 210'; 310, 310') of said at least one accommodation (21; 31) and/or of the inner surface of the rear portion (211; 311) of said at least one accommodation (21; 31), namely of the entire inner surface of such a portion (210, 210', 211; 310, 310', 311) of said at least one accommodation (21; 31).

Alternatively or additionally, said lining (namely consisting of an overmolding) can be a lining of at least a portion (221, 221', 222, 222'; 321, 321', 322, 322') of the internal section (220, 220'; 320, 320') of said at least one electrical connecting organ (22, 22'; 32, 32'), more particularly of at least a portion (221, 221', 222, 222'; 321, 321', 322, 322') of the internal section (220, 220'; 320, 320') of said at least two electrical connecting organs (22, 22'; 32, 32'), namely of at least the front portion (221, 221'; 321, 321') of said internal section (220, 220'; 320, 320') and/or of at least the rear portion (222, 222'; 322, 322') of said internal section (220, 220'; 320, 320') of such an electrical connecting organ (22, 22'; 32, 32').

In fact, such a lining is namely a lining of the whole of such a portion (221, 221', 222, 222'; 321, 321', 322, 322') of the internal section (220, 220'; 320, 320') of such an electrical connecting organ (22, 22'; 32, 32') and/or of the outer surface of such a portion (221, 221', 222, 222'; 321, 321', 322, 322') of the internal section (220, 220'; 320, 320') of such an electrical connecting organ (22, 22'; 32, 32').

According to a third embodiment, the electrical insulating means (23; 33) each include (even each consist of) at least one flexible sleeve positioned (more particularly inserted into) inside at least a portion (210, 210', 211; 310, 310', 311) of said at least one accommodation (21; 31), more particularly inside the front portion (210, 210'; 310, 310') of said at least one accommodation (21; 31) and/or inside the rear portion (211; 311) of said at least one accommodation (21; 31). Such a flexible sleeve is, more particularly, positioned near the inner surface of said at least one accommodation (21; 31), even applied against this inner surface of said at least one accommodation (21; 31).

Alternatively or (and preferably) additionally to this third embodiment, inside such a flexible sleeve is positioned at least a portion (221, 221', 222, 222'; 321, 321', 322, 322') of the internal section (220, 220'; 320, 320') of said at least one electrical connecting organ (22, 22'; 32, 32'), more particularly, is positioned at least a portion (221, 221', 222, 222'; 321, 321', 322, 322') of the internal section (220, 220'; 320, 320') of said at least two electrical connecting organs (22, 22'; 32, 32'), namely at least a front portion (221, 221'; 321, 321') of the internal section (220, 220'; 320, 320') of such an electrical connecting organ (22, 22'; 32, 32') and/or at least a rear portion (222, 222'; 322, 322') of the internal section (220, 220'; 320, 320') of such an electrical connecting organ (22, 22'; 32, 32'). In fact, said at least a portion (221, 222; 321, 322) of the internal section (220; 320) of one (22; 32) of said at least two electrical connecting organs (22, 22'; 32, 32') is positioned inside a flexible sleeve, while said at least a portion (221', 222'; 321', 322') of the internal section (220'; 320') of another one (22'; 32') of said at least two electrical connecting organs (22, 22'; 32, 32') is positioned inside another flexible sleeve.

Such a flexible sleeve is, more particularly, positioned close to the outer surface of the internal section (220, 220'; 320, 320') of such an electrical connecting organ (22, 22'; 32, 32'), even applied against this outer surface of the internal section (220, 220'; 320, 320') of such an electrical connecting organ (22, 22'; 32, 32').

In fact, such a sleeve extends namely over the entire length of said portion (210, 210', 211; 310, 310', 311) of said at least one accommodation (21; 31) and/or over the entire length of said portion (221, 221', 222, 222'; 321, 321', 322, 322') of the internal section (220, 220'; 320, 320') of such an electrical connecting organ (22, 22'; 32, 32'), even over the entire length of the internal section (220, 220'; 320, 320') of such an electrical connecting organ (22, 22'; 32, 32'). Said portion (221, 221', 222, 222'; 321, 321', 322, 322') of the internal section (220, 220'; 320, 320') of such an electrical connecting organ (22, 22'; 32, 32'), even the internal section (220, 220'; 320, 320') of such an electrical connecting organ (22, 22'; 32, 32'), then extends completely inside such a sleeve.

According to a fourth embodiment, the electrical insulating means (23; 33) include a layer of electrical insulating material (230, 230'; 330, 330') interposed between, on the one hand, the inner surface of at least a portion (210, 210', 211; 310, 310', 311) of said at least one accommodation (21; 31), more particularly the inner surface of the front portion (210, 210'; 310, 310') of said at least one accommodation (21; 31) and/or the inner surface of the rear portion (211; 311) of said at least one accommodation (21; 31) and, on the other hand, the outer surface of at least a portion (221, 221', 222, 222'; 321, 321', 322, 322') of the internal section (220, 220'; 320, 320') of said at least one electrical connecting organ (22, 22'; 32, 32'), more particularly the outer surface of at least a portion (221, 221', 222, 222'; 321, 321', 322, 322') of the internal section (220, 220'; 320, 320') of said at least two electrical connecting organs (22, 22'; 32, 32'), namely the outer surface of the front portion (221, 221'; 321, 321') of said internal section (220, 220'; 320, 320') and/or the outer surface of the rear portion (222, 222'; 322, 322') of said internal section (220, 220'; 320, 320') of such an electrical connecting organ (22, 22'; 32, 32').

In fact, such a layer of electrical insulating material (230, 230'; 330, 330') is preferably applied (namely by overmolding) onto such a surface, more particularly onto the outer surface of at least a portion (221, 221', 222, 222'; 321, 321', 322, 322') of the internal section (220, 220'; 320, 320') of such an electrical connecting organ (22, 22'; 32, 32') and/or onto the inner surface of at least a portion (210, 210', 211 ; 310, 310', 311) of said at least one accommodation (21; 31).

Preferably, such a layer of electrical insulating material (230, 230'; 330, 330') consists of an overmolding on such a surface.

Finally and according to a fifth embodiment, the electrical insulating means (23; 33) include an electrical insulating block (231; 331), which is located at least inside at least a portion (210, 210', 211 ; 310, 310', 311) of said at least one accommodation (21; 31), more particularly inside the front portion (210, 210'; 310, 310') of said at least one accommodation (21; 31) and/or inside the rear portion (211; 311) of said at least one accommodation (21; 31).

Such an electrical insulating block (231; 331) receives inside at least a portion (221, 221', 222, 222'; 321, 321', 322, 322') of the internal section (220, 220'; 320, 320') of said at least one electrical connecting organ (22, 22'; 32, 32'), more particularly at least a portion (221, 221', 222, 222'; 321, 321', 322, 322') of the internal section (220, 220'; 320, 320') of said at least two electrical connecting organs (22, 22'; 32, 32'), namely the front portion (221, 221'; 321, 321') of said internal section (220, 220'; 320, 320') and/or the rear portion (222, 222'; 322, 322') of said internal section (220, 220'; 320, 320') of said at least one electrical connecting organ (22, 22'; 32, 32').

In fact, such an electrical insulating block (231; 331) is preferably overmolded on the inner surface of at least a portion (210, 210', 211 ; 310, 310', 311) of said at least one accommodation (21; 31) and/or on the outer surface of at least a portion (221, 221', 222, 222'; 321, 321', 322, 322') of the internal section (220, 220'; 320, 320') of said at least one electrical connecting organ (22, 22'; 32, 32'), more particularly of said at least two electrical connecting organs (22, 22'; 32, 32').

Yet another feature relates to the fact that the electrical insulating means (23; 33) also extend from said at least one electrical connecting organ (22, 22'; 32, 32'), in a direction opposite to that in which said at least one electrical connecting organ (22, 22'; 32, 32') extends. In this respect, it should be observed that, more particularly, at least a portion of the electrical insulating block (231; 331) extends in this way.

As mentioned above, the connector body (20; 30) has a front end (201; 301) and a rear end (202; 302). The electrical insulating means (23; 33) then extend at least from the front end (201; 301) and to the rear end (202; 302) of the connector body (20; 30), in a continuous way.

Yet another feature consists in that the connector body (20; 30) includes means (24; 34) for receiving at least one electric wire, which a bundle of electric wires (not shown) includes. These receiving means (24; 34) adopt, more particularly, the shape of a channel into which is inserted and/or through which passes at least one such electric wire.

In this respect, it should be observed that, more particularly, the electrical insulating means (23; 33) include such means for receiving (24; 34) at least one electric wire, which a bundle electric wires includes, more particularly the portion of the electrical insulating means (23; 33), which extends from said at least one electrical connecting organ (22, 22'; 32, 32'), in an direction opposite to that in which said at least one electrical connecting organ (22, 22'; 32, 32') extends. As can be seen in the attached figures, in fact, the electrical insulating block (231; 331) includes such receiving means (24; 34).

An additional feature consists in that the electrical insulating means (23; 33) include at least one silicone, namely a flexible silicone.

Finally, the electrical insulating means (23; 33) preferably consist of an overmolding of a material having a tracking resistance index, CTI, higher than 600, on the inner surface of at least a portion (210, 210', 211; 310, 310', 311) of said at least one accommodation (21; 31) and/or on the outer surface of at least a portion (221, 22'1, 222, 222'; 321, 321', 322, 322') of the internal section (220, 220'; 320, 320') of said at least one electrical connecting organ (22, 22'; 32, 32'), more particularly on the outer surface of at least a portion (221, 221', 222, 222'; 321, 321', 322, 322') of the internal section (220, 220'; 320, 320') of said at least two electrical connecting organs (22, 22'; 32, 32'), as described above.

Such an overmolding can, as mentioned above, adopt the form of a coating, a lining, a layer of insulating material (230, 230'; 330, 330') or an electrical insulating block (231; 331).

As mentioned above, said at least one accommodation (21; 31) includes at least one front portion (210, 210'; 310, 310') and one rear portion (211; 311), while the internal section (220, 220'; 320, 320') of said at least one electrical connecting organ (22, 22'; 32, 32') includes a front portion (221, 221'; 321, 321') and a rear portion (222, 222'; 322, 322'). In particular, the internal section (220, 220'; 320, 320') of said at least two electrical connecting organs (22, 22'; 32, 32') includes such a front portion (221, 221'; 321, 321') and such a rear portion (222, 222'; 322, 322').

With that in mind, the electrical insulating means (23; 33) include at least one front electrical insulating element (232, 232'; 332, 332'), on the one hand, which is located in said at least one front portion (210, 210'; 310, 310') of said at least one accommodation (21; 31), on the other hand, which surrounds at least the front portion (221, 221'; 321, 321') of the internal section (220, 220'; 320, 320') of said at least one electrical connecting organ (22, 22'; 32, 32') and, yet on the other hand, which extends over the front portion (221, 221'; 321, 321') of the internal section (220, 220'; 320, 320') of said at least one electrical connecting organ (22, 22'; 32, 32').

As mentioned above, said at least one accommodation (21; 31) includes at least two front portions (210, 210'; 310, 310') and one rear portion (211; 311), while said electrical connector (2; 3) includes at least two electrical connecting organs (22, 22'; 32, 32'), which each include an internal section (220, 220'; 320, 320'), which includes a front portion (221, 221'; 321, 321') and a rear portion (222, 222'; 322, 322').

The electrical insulating means (23; 33) then include at least two front electrical insulating elements (232, 232'; 332, 332'), which are located in the front portions (210, 210'; 310, 310') of said at least one accommodation (21; 31), which surround at least the front portion (221, 221'; 321, 321') of the internal section (220, 220'; 320, 320') of said at least two electrical connecting organs (22, 22'; 32, 32'), which extend over the front portion (221, 221'; 321, 321') of the internal section (220, 220'; 320, 320') of said at least two electrical connecting organs (22, 22'; 32, 32'). In fact, one (232; 332) of said at least two front electrical insulating elements (232, 232'; 332, 332') is located in one (210; 310) of the front portions (210, 210'; 310, 310') of said at least one accommodation (21; 31), surrounds at least the front portion (221, 221'; 321, 321') of the internal section (220, 220'; 320, 320') of one (22; 32) of said at least two electrical connecting organs (22, 22'; 32, 32') and extends over the front portion (221, 221'; 321, 321') of the internal section (220, 220'; 320, 320') of one (22; 32) of said at least two electrical connecting organs (22, 22'; 32, 32'), while the other one (232'; 332') of said at least two front electrical insulating elements (232, 232'; 332, 332') is located in the other one (210'; 310') of the front portions (210, 210'; 310, 310') of said at least one accommodation (21; 31), surrounds at least the front portion (221, 221'; 321, 321') of the internal section (220, 220'; 320, 320') of the other one (22'; 32') of said at least two organs electrical connection (22, 22'; 32, 32') and extends over the front portion (221, 221'; 321, 321') of the internal section (220, 220'; 320, 320') of the other one (22'; 32') of said at least two electrical connecting organs (22, 22'; 32, 32').

According to a first embodiment, said at least one front electrical insulating element (232, 232'; 332, 332') includes said at least one coating or said at least one lining mentioned above. More particularly, said at least two front electrical insulating elements (232, 232'; 332, 332') each include said at least one coating or said at least one lining mentioned above.

According to a second embodiment, said at least one front electrical insulating element (232, 232'; 332, 332') includes said layer of electrical insulating material (230, 230'; 330, 330') mentioned above. More particularly, said at least two front electrical insulating elements (232, 232'; 332, 332') each include such a layer of electrical insulating material (230, 230'; 330, 330').

As mentioned above, said at least one front electrical insulating element (232, 232'; 332, 332') may consist of an overmolding of a material having a tracking resistance index, CTI, higher than 600, as mentioned above.

At the same time, these electrical insulating means (23; 33) include at least one rear electrical insulating element (233; 333), on the one hand, which is located in the rear portion (211; 311) of said at least one accommodation (21; 31), on the other hand, which surrounds at least the rear portion (222, 222'; 322, 322') of the internal section (220, 220'; 320, 320') of said at least one electrical connecting organ (22, 22'; 32, 32'), yet on the other hand, which extends over the rear portion (222, 222'; 322, 322') of the internal section (220, 220'; 320, 320') of said at least one electrical connecting organ (22, 22'; 32, 32') and, also on the other hand, which includes at least said electrical insulating block (231; 331).

As mentioned above, said at least one accommodation (21; 31) includes at least two front portions (210, 210'; 310, 310') and one rear portion (211; 311), while said electrical connector (2; 3) includes at least two electrical connecting organs (22, 22'; 32, 32'), which each includes an internal section (220, 220'; 320, 320'), which includes a front portion (221, 221'; 321, 321') and a rear portion (222, 222'; 322, 322').

The electrical insulating means (23; 33) then include at least one rear electrical insulating element (233; 333), which is located in the rear portion (211; 311) of said at least one accommodation (21; 31), which surrounds at least the rear portion (222, 222'; 322, 322') of the internal section (220, 220'; 320, 320') of said at least two electrical connecting organs (22, 22'; 32, 32'), which extends over the rear portion (222, 222'; 322, 322') of the internal section (220, 220'; 320, 320') of said at least two electrical connecting organs (22, 22'; 32, 32') and which includes at least said electrical insulating block (231; 331).

As mentioned above, said at least one rear electrical insulating element (233; 333) can, here too, consist of an overmolding of a material having a tracking resistance index, CTI, higher than 600, as mentioned above.

Another feature of the (male 2; female 3) electrical connector is related to the fact that the connector body (20; 30) includes, on the one hand, a casing (25; 35), which includes said at least one front portion (210, 210'; 310, 310') of said at least one accommodation (21; 31) as well as said rear portion (211; 311) of said at least one accommodation (21; 31), and which receives inside the internal section (220, 220'; 320, 320') of said at least one electrical connecting organ (22, 22'; 32, 32') as well as at least a portion of the electrical insulating means (23; 33).

In this respect, it should be observed that such a casing (25; 35) then includes, more particularly, said at least two front portions (210, 210'; 310, 310') of said at least one accommodation (21; 31) as well as said rear portion (211; 311) of said at least one accommodation (21; 31), and receives inside the internal section (220, 220'; 320, 320') of said at least two electrical connecting organs (22, 22'; 32, 32') as well as at least a portion of the electrical insulating means (23; 33).

On the other hand, this connector body (20; 30) includes a closing element (26; 36), which is configured to close the casing (25; 35), which is located at least inside said rear portion (211; 311) of said at least one accommodation (21; 31), which includes said insulating block (231; 331), and which receives inside at least a portion of the internal section (220, 220'; 320, 320') of said at least one electrical connecting organ (22, 22'; 32, 32'), more particularly at least a portion of the internal section (220, 220'; 320, 320') of said at least two electrical connecting organs (22, 22'; 32, 32').

In fact, this casing (25; 35) is made of at least one rigid insulating material, the tracking resistance index, CTI, of which is higher than 150. Such a rigid insulating material can be a thermoplastic material.

Yet another feature is related to the fact that the connector body (20; 30) includes at least one wing socket (27, 27'; 37, 37'), which surrounds at least a portion of the internal section (220, 220'; 320, 320') of said at least one electrical connecting organ (22, 22'; 32, 32'), more particularly the front portion (221, 221'; 321, 321') of the internal section (220,

220'; 320, 320') of said at least one electrical connecting organ (22, 22'; 32, 32'). Such a wing socket (27, 27'; 37, 37') extends over a portion of the internal section (220, 220'; 320, 320') of said at least one electrical connecting organ (22, 22'; 32, 32'), more particularly over the front portion (221, 221'; 321, 321') of the internal section (220, 220'; 320, 320') of said at least one electrical connecting organ (22, 22'; 32, 32').

Such a wing sleeve (27, 27'; 37, 37') includes, on the one hand, a front portion (270, 270'; 370, 370'), which extends at least partially inside the front portion (210, 210'; 310, 310') of said at least one accommodation (21; 31) and which cooperates with said at least one electrical connecting organ (22, 22'; 32, 32'), more particularly with a median locking collar, which the internal section (220, 220'; 320, 320') of said at least one electrical connecting organ (22, 22'; 32, 32') includes, more particularly which the front portion (221, 221'; 321, 321') of this internal section (220, 220'; 320, 320') includes. Such cooperation permits to maintain said at least one electrical connecting organ (22, 22'; 32, 32') in position inside said at least one accommodation (21; 31) and, hence, inside the electrical connector (20; 30).

On the other hand, such a wing sleeve (27, 27'; 37, 37') includes a rear portion (271, 271'; 371, 371'), which extends at least partially inside the rear portion (211; 311) of said at least one accommodation (21; 31) and/or inside the electrical insulating means (23; 33), more particularly inside said layer of insulating material (230, 230'; 330, 330') or (and preferably) inside said electrical insulating block (231; 331).

Yet another feature is related to the fact that the connector body (20; 30) includes a retaining element (28; 38), which includes, on the one hand, a plurality of wing sockets (27, 27'; 37, 37'), which each include a front portion (270, 270'; 370, 370') cooperating (as described above) with one of said electrical connecting organs (22, 22'; 32, 32') as well as a rear portion (271, 271'; 371, 371') extending (as described above) inside the electrical insulating means (23; 33) and, on the other hand, a frame (280; 380), which the wing sockets (27, 27'; 37, 37') are integral with, and extending inside the electrical insulating means (23; 33).

The invention also relates to a male electrical connector 2, which has at least part (even, and preferably, all) of the features of the electrical connector (2; 3) described above.

In particular, this male electrical connector 2 includes (as mentioned above), on the one hand, a male connector body 20, which includes at least one accommodation 21, on the other hand, at least one male electrical connecting organ (22, 22'), more particularly at least two male electrical connecting organs (22, 22').

Said at least one male electrical connecting organ (22, 22') includes, as described above, an internal section (220, 220') extending at least partially inside said at least one accommodation 21 of the connector body 20. Said at least one male electrical connecting organ (22, 22') also includes an external section (223, 223') extending at least partially outside said male connector body 20, more particularly at least partially outside said at least one accommodation 21 of the connector body 20. More particularly, said at least two male electrical connecting organs (22, 22') each include such an internal section (220, 220') extending inside said at least one accommodation 21 as well as such an external section (223, 223') extending outside the male connector body 20.

According to the invention, this male electrical connector 2 includes the electrical insulating means 23, which then surround, as described above, the internal section (220, 220') of said at least one male electrical connecting organ (22, 22'), more particularly the internal section (220, 220') of said at least two male electrical connecting organs (22, 22'), but also at least a portion of the external section (223, 223') of said at least one male electrical connecting organ (22, 22'), more particularly at least a portion of the external section (223, 223') of said at least two male electrical connecting organs (22, 22').

These electrical insulating means 23 then extend, as described above, over the internal section (220, 220') of said at least one male electrical connecting organ (22, 22'), more particularly over the internal section (220, 220') of said at least two male electrical connecting organs (22, 22'), but also over a portion of the external section (223, 223') of said at least one male electrical connecting organ (22, 22'), more particularly over a portion of the external section (223, 223') of said at least two male electrical connecting organs (22, 22').

Yet another feature is related to the fact that the electrical insulating means 23 include at least one nipple (234, 234'), which extends outside the male connector body 20, which surrounds at least a portion of the external section (223, 223') of said at least one male electrical connecting organ (22, 22'), more particularly of said at least two electrical connecting organs (22, 22'; 32, 32'), and which extends over a portion of the external section (223, 223') of said at least one male electrical connecting organ (22, 22'), more particularly of said at least two electrical connecting organs (22, 22'; 32, 32').

In this respect, it should be observed that, more particularly, said at least one front electrical insulating element (232, 232') includes such a nipple (234, 234').

Said at least one male electrical connecting organ (22, 22'), in fact, each consists of a male connecting pin.

The invention also relates to a female electrical connector 3, which has at least part (even, and preferably, all) of the features of the electrical connector (2 ; 3) described above.

In particular, this female electrical connector 3 includes (as mentioned above), on the one hand, a female connector body 30, which includes at least one accommodation 31 and, on the other hand, at least one female electrical connecting organ (32, 32'), more particularly at least two female electrical connecting organs (32, 32').

Such a female electrical connecting organ (32, 32') each includes an internal section (320, 320') extending inside the female connector body 30, more particularly inside said at least one accommodation 31.

According to the invention, this female electrical connector 3 includes the electrical insulating means 33, which then surround, as described above, the internal section (320, 320') of said at least one female electrical connecting organ (32, 32'), more particularly the internal section (320, 320') of said at least two female electrical connecting organs (32, 32').

These electrical insulating means 33 then extend, as described above, over the internal section (320, 320') of said at least one female electrical connecting organ (32, 32'), more particularly over the internal section (320, 320') of said at least two female electrical connecting organs (32, 32').

Additionally, these electrical insulating means 33 also extend in front of the internal section (320, 320') of said at least one female electrical connecting organ (32, 32'). This advantageously permits these electrical insulating means 33 of the female electrical connector 3 to cooperate with the electrical insulating means 23 of the male electrical connector 2. This results into a continuity of the electrical insulating means (23; 33) between the rear end 202 of the male electrical connector 2 and the rear end 302 of the female electrical connector 3 and, thus, a continuity in the electrical insulation between this rear end 202 of the male electrical connector 2 and this rear end 302 of the connector electric female 3.

Said at least one female electrical connecting organ (32, 32') each consists in fact of a female connecting socket.

Such a female connection socket is configured to cooperate with one of the male connecting pins mentioned above.

Finally, the invention relates to an electrical connecting device 1 including, on the one hand, a male electrical connector 2 and, on the other hand, a female electrical connector 3.

In this electrical connecting device 1, on the one hand, the male electrical connector 2 has the features described above and, on the other hand, the female electrical connector 3 has the features described above.

Additionally, the electrical insulating means 23 of the male electrical connector 2 are located in the extension of the electrical insulating means 33 of the female electrical connector 3 and cooperate with these electrical insulating means 33 of the female electrical connector 3.

As mentioned above, this results into a continuity of the electrical insulating means (23; 33) between the rear end 202 of the male electrical connector 2 and the rear end 302 of the female electrical connector 3 and, thus, a continuity in the electrical insulation between this rear end 202 of the male electrical connector 2 and this rear end 302 of the female electrical connector 3.

What is claimed:

1. An electrical connector comprising:

a connector body, which includes at least one accommodation, wherein the at least one accommodation includes at least two front portions, at least two electrical connecting organs, each of which includes an internal section extending inside the at least one accommodation of the connector body, wherein at least a portion of the internal section of each of the at least two electrical connecting organs extends in a respective one of the at least two front portions of the at least one accommodation, and electrical insulating means, wherein the electrical insulating means are in an insulating material having a tracking resistance index higher than 600, wherein the electrical insulating means are located at least inside the at least one accommodation, and wherein the electrical insulating means (i) extend over at least a portion of the internal section of each of the at least two electrical connecting organs, and (ii) surround at least a portion of the internal section of each of the at least two electrical connecting organs, wherein the electrical insulating means extend between an inner surface of each of the at least two front portions of the at least one accommodation and an outer surface of each of the at least two electrical connecting organs, wherein at least a portion of the connector body including the inner surface of each of the at least two front portions of the at least one accommodation is in an insulating material more rigid than the insulating material of the electrical insulating means.

2. The electrical connector according to claim 1, wherein the electrical insulating means are in contact at least with at least one selected from the group consisting of (i) the internal section of each of the at least two electrical connecting organs, and (ii) the inner surface of each of the two front portions of the at least one accommodation.

3. The electrical connector according to claim 1, wherein the electrical insulating means include either at least one coating applied onto at least one selected from the group consisting of (i) the inner surface of at least a portion of each of the two front portions of the at least one accommodation and (ii) at least a portion of the internal section of each of the at least two electrical connecting organs, or at least one lining of the inner surface of at least one selected from the group consisting of (i) at least a portion of each of the two front portions of the at least one accommodation and (ii) at least a portion of the internal section of each of the at least two electrical connecting organs.

4. The electrical connector according to claim 1, wherein the electrical insulating means include at least one flexible sleeve comprising at least two portions, wherein at least one selected from the group consisting of (i) each of the at least two portions of the flexible sleeve is positioned inside at least a portion of a respective one of the at least two front portions of the at least one accommodation and (ii) at least a portion of the internal section of each of the at least two electrical connecting organs is positioned inside a respective one of the at least two portions of the flexible sleeve.

5. The electrical connector according to claim 1, wherein the electrical insulating means comprise a respective layer of an electrical insulating material interposed between (i) the inner surface of at least a portion of each of the at least two front portions of the at least one accommodation and (ii) the outer surface of at least a portion of the internal section of each of the at least two electrical connecting organs.

6. The electrical connector according to claim 1, wherein the electrical insulating means include an electrical insulating block, wherein the electrical insulating block is located at least inside at least a portion of the at least one accommodation, and receives inside at least a portion of the internal section of the at least two electrical connecting organs.

7. The electrical connector according to claim 1, wherein the connector body has a front end and a rear end, and wherein the electrical insulating means extend at least from the front end to the rear end of the connector body, in a continuous way.

8. The electrical connector according to claim 1, wherein the electrical insulating means include at least one silicone, which is a flexible silicone.

9. The electrical connector according to claim 1, wherein the electrical insulating means consist of an overmolding of a material having a tracking resistance index higher than 600, on at least one selected from the group consisting of (i) an inner surface of at least a portion of the at least one accommodation and (ii) an outer surface of at least a portion of the internal section of the at least two electrical connecting organs.

10. The electrical connector according to claim 3, wherein the at least one accommodation includes at least one rear portion, an internal section of the at least two electrical connecting organs includes a front portion at least part of which extends inside the front portions of the at least one accommodation, and a rear portion at least part of which extends inside the rear portion of the at least one accommodation, and the electrical insulating means include at least two front electrical insulating elements, wherein the at least two front electrical insulating elements are located in the front portions of the at least one accommodation, surround at least the front portion of the internal section of the at least two electrical connecting organs, extend over the front portion of the internal section of the at least two electrical connecting organs, and each include the at least one coating or the at least one lining.

11. The electrical connector according to claim 5, wherein the at least one accommodation includes at least one rear portion, and the internal section of the at least two electrical connecting organs includes a front portion at least part of which extends inside the front portions of the at least one accommodation, and a rear portion at least part of which extends inside the rear portion of the at least one accommodation, and the electrical insulating means include at least two front electrical insulating elements, wherein the at least two front electrical insulating elements are located in the front portions of the at least one accommodation, surround at least the front portion of the internal section of the at least two electrical connecting organs, extend over the front portion of the internal section of the at least two electrical connecting organs, and each include the layer of electrical insulating material.

12. The electrical connector according to claim 6, wherein the at least one accommodation includes at least one rear portion, and the internal section of the at least two electrical connecting organs includes a front portion at least part of which extends inside the front portions of the at least one accommodation, and a rear portion at least part of which extends inside the rear portion of the at least one accommodation, and the electrical insulating means include at least one rear electrical insulating element, wherein the at least one rear electrical insulating element is located in the rear portion of the at least one accommodation, surrounds at least the rear portion of the internal section of the at least two electrical connecting organs, extends over the rear portion of the internal section of the at least two electrical connecting organs, and includes at least the electrical insulating block.

13. The electrical connector according to claim 6, wherein the at least one accommodation includes at least one rear portion, and the internal section of the at least two electrical connecting organs includes a front portion at least part of which extends inside the front portions of the at least one accommodation, and a rear portion at least part of which extends inside the rear portion of the at least one accommodation, and the connector body includes a casing, which includes the at least two front portions of the at least one accommodation and the rear portion of the at least one accommodation, and which receives therein the internal section of the at least two electrical connecting organs and at least a portion of the electrical insulating means, and a closing element, wherein the closing element is configured to close the casing, is located at least inside the rear portion of the at least one accommodation, receives therein at least a portion of the internal section of the at least two electrical connecting organs, and includes the electrical insulating block.

14. The electrical connector according to claim 1, wherein the connector body includes a retaining element, wherein the retaining element includes a plurality of wing sockets, which each include a front portion cooperating with one of the electrical connecting organs and a rear portion extending inside the electrical insulating means, and a frame, which is made integral with the wing sockets, and which extends inside the electrical insulating means.

15. The electrical connector according to claim 1, wherein the electrical connector is a male electrical connector, wherein the at least two electrical connecting organs are at least two male electrical connecting organs.

16. The electrical connector according to claim 1, wherein the electrical connector is a female electrical connector, wherein the at least two electrical connecting organs are at least two female electrical connecting organs.

17. An electrical connecting device including the male electrical connector according to claim 15 and a female electrical connector, wherein the female electrical connector includes a female connector body, which includes at least one accommodation of the female connector body, wherein the at least one accommodation of the female connector body includes at least two front portions, and at least two female electrical connecting organs, each of which includes an internal section extending inside the at least one accommodation of the female connector body, wherein at least a portion of the internal section of each of the at least two female electrical connecting organs extends in a respective one of the at least two front portions of the at least one accommodation of the female connector body, and an electrical insulating means of the female electrical connector, wherein the electrical insulating means of the female electrical connector are in an insulating material having a tracking resistance index higher than 600, wherein the electrical insulating means of the female electrical connector are located at least inside the at least one accommodation of the female connector body, and wherein the electrical insulating means of the female electrical connector (i) extend over at least a portion of the internal section of each of the at least two female electrical connecting organs, and (ii) surround at least a portion of the internal section of each of the at least two female electrical connecting organs, wherein the electrical insulating means of the female electrical connector extend between an inner surface of each of the at least two front portions of the at least one accommodation of the female connector body and an outer surface of each of the at least two female electrical connecting organs, wherein at least a portion of the female connector body including the inner surface of each of the at least two front portions of the at least one accommodation of the female connector body is in an insulating material more rigid than the insulating material of the electrical insulating means of the female electrical connector.

18. The electrical connecting device according to claim 17, wherein the electrical insulating means of the male electrical connector surround at least a first portion of an external section of the at least two male electrical connecting organs and extend over a second portion of the external section of the at least two male electrical connecting organs.

19. The electrical connecting device according to claim 18, wherein the electrical insulating means of the male electrical connector are located in continuous electrical insulation continuity with the electrical insulating means of the female electrical connector.

20. The electrical connecting device according to claim 17, wherein the electrical insulating means of the male electrical connector are located in continuous electrical insulation continuity with the electrical insulating means of the female electrical connector.

* * * * *